July 20, 1954     F. H. KAYLER     2,684,237
AXLE ASSEMBLY WITH REMOVABLE SPRING MEANS
Filed Aug. 10, 1951     2 Sheets-Sheet 1
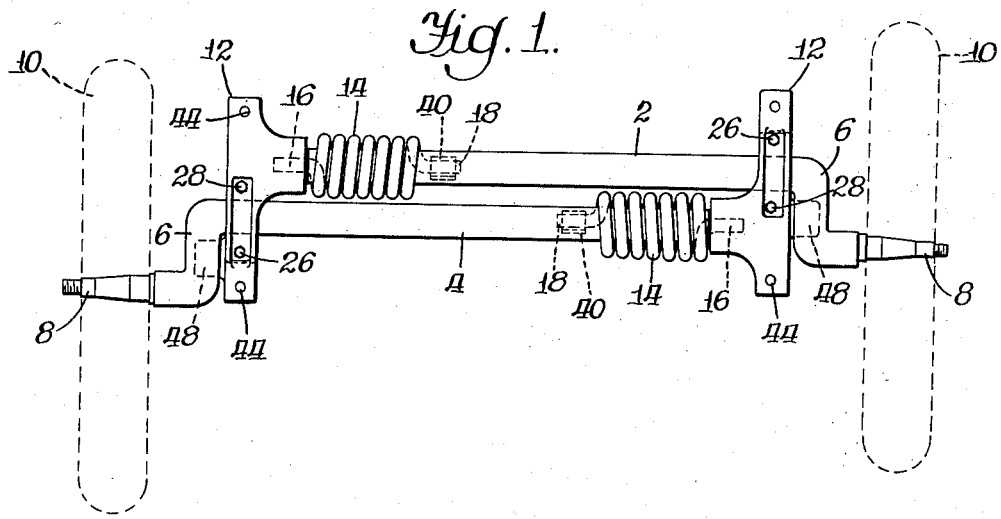
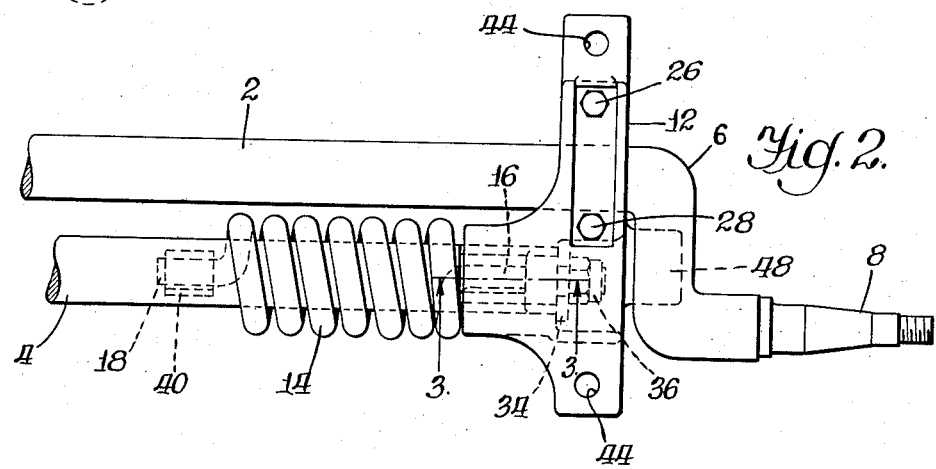
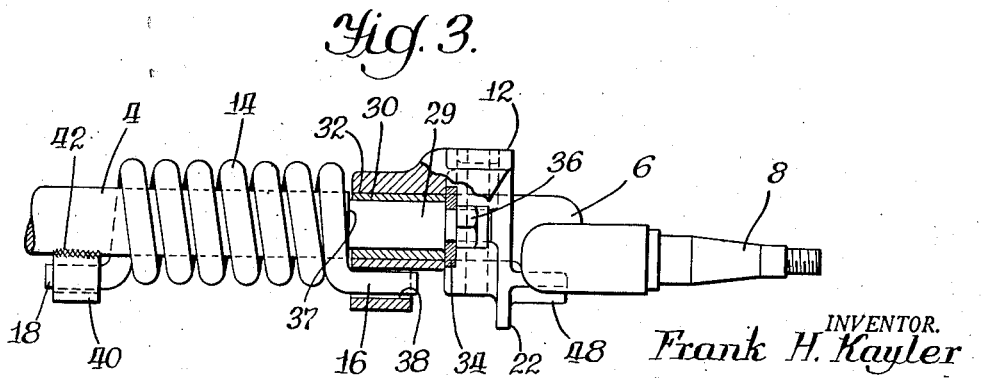
INVENTOR.
Frank H. Kayler July 20, 1954   F. H. KAYLER   2,684,237
AXLE ASSEMBLY WITH REMOVABLE SPRING MEANS
Filed Aug. 10, 1951   2 Sheets-Sheet 2
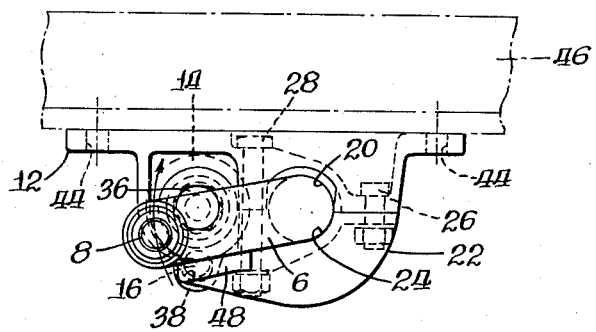
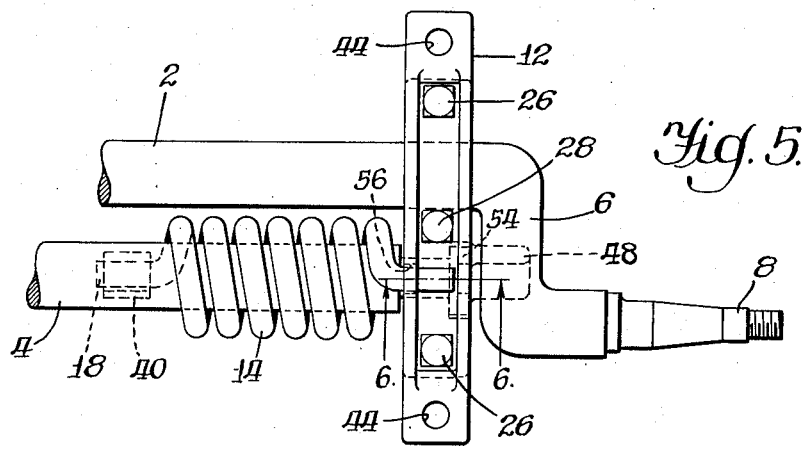
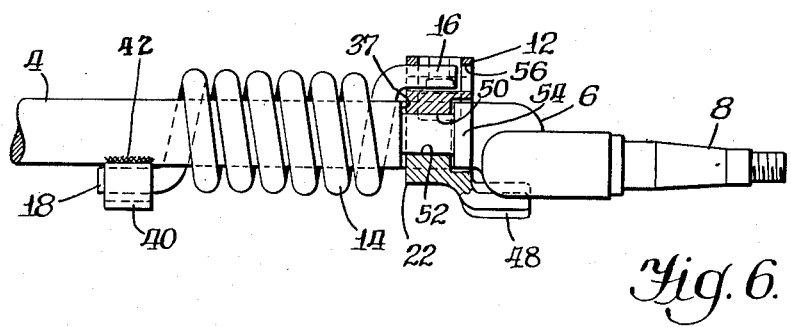
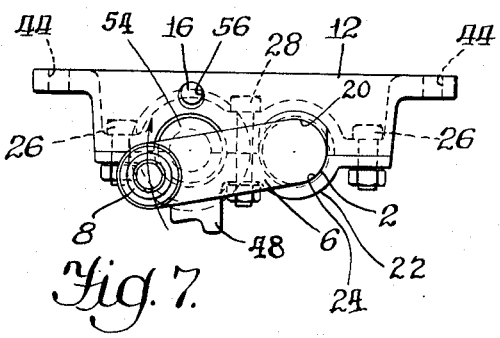
INVENTOR.
Frank H. Kayler Patented July 20, 1954

2,684,237

UNITED STATES PATENT OFFICE 2,684,237

AXLE ASSEMBLY WITH REMOVABLE SPRING MEANS

Frank H. Kayler, Alliance, Ohio, assignor to American Steel Foundries, Chicago, Ill., a corporation of New Jersey Application August 10, 1951, Serial No. 241,260

7 Claims. (Cl. 267—58)

This invention relates to wheel and axle assemblies and more particularly to a novel assembly having crank type wheel supports and having spring means for resisting rotation of the cranks in response to a load on the supported vehicle or in response to irregularities in the road encountered by the wheels of the vehicle.

A primary object of the present invention is to devise a wheel and axle assembly, such as above described, wherein a bump encountered by one of the wheels cannot tip the supported vehicle. This object is accomplished by providing a pair of axles with crank arms at the remote ends. The arm of one axle being carried by a wheel at one side of the vehicle and the arm of the other axle being carried by a wheel at the other side of the vehicle. Independent springs are provided for resisting upward rotation of the respective arms in response to wheel loads or road irregularities encountered by the wheels.

Another object of the invention is to minimize impacts on the vehicle from irregularities such as tar strips extending across the road. This object is accomplished by disposing the crank arm at one side of the vehicle forwardly of the crank arm at the other side of the vehicle so that the wheels do not simultaneously encounter such irregularities.

Still another object of the invention is to provide a compact spring arrangement by spacing the axles a sufficient distance from each other fore and aft of the vehicle to accommodate coil springs sleeved over the axles, said spring being anchored at corresponding ends thereof to the respective axles and said springs being anchored at opposite corresponding ends thereof to the supported vehicle.

A further object of the invention is to devise a wheel and axle assembly, such as above described, wherein all of the parts including the springs may be quickly assembled and disassembled to facilitate replacement and repair of the parts.

The foregoing and other objects and advantages of the invention will become apparent from a consideration of the following specification and the accompanying drawings, wherein:

Figure 1 is a top plan view of a wheel and axle assembly embodying a preferred form of the invention;

Figure 2 is an enlarged fragmentary top plan view of one end of the assembly shown in Figure 1;

Figure 3 is a rear elevational view of the structure shown in Figure 2, with portions broken away on the line 3—3 of Figure 2, for the sake of clarity;

Figure 4 is an end elevational view of the structure shown in Figure 2;

Figure 5 is a fragmentary top plan view corresponding to Figure 2, but illustrating a modified form of the invention;

Figure 6 is a rear elevational view partly in section on the line 6—6 of Figure 5, and Figure 7 is an end elevational view of the modification shown in Figure 5.

Describing the invention in detail and referring first to the embodiment thereof illustrated in Figure 1, the novel wheel and axle assembly comprising a pair of substantially identical axles or shafts 2 and 4, each having a crank or lever arm 6 with a spindle 8 for convenient connection in the usual manner to a conventional wheel, diagrammatically indicated at 10.

Each axle is connected, as hereinafter described in detail, to a pair of brackets 12 and is provided with a coil spring 14 sleeved over the axle at the end thereof remote from its crank arm 6. Opposite ends, 16 and 18, of each coil spring are anchored to the adjacent bracket 12 and to the associated axle 2 or 4, as hereinafter described in detail, for the purpose of resisting upward rotation of the crank arms 6 in response to a supported load or in response to bumps or other irregularities encountered by the wheels.

Referring now to Figures 2 to 4, which show in detail one end of the wheel and axle assembly illustrated in Figure 1, it will be seen that the crank end of each axle inboardly of its crank arm 6 is rotatably journalled within a substantially semi-cylindrical bearing 20 of the related bracket 12 and is secured within the bearing 20 by a cap 22 having a similar bearing 24, whereby the bearings 20 and 24 afford journal means for the axle accommodating rotation thereof. The cap 22 is preferably detachably secured to the bracket 12 as, for example, by bolt and nut assemblies 26 and 28.

The end of each axle remote from its crank arm 6 is preferably provided with a smaller-diameter portion 29 rotatably journalled within a bearing 30 fitted in a complementary socket 32 of the bracket 12 which journals the crank end of the other axle. The smaller-diameter portion 29 of each axle is secured within the related socket by a washer 34 attached to the axle by a cap screw 36, said washer bearing against the bracket 12 and bearing 30 at the outboard end of the socket 32. The smaller-diameter portion 29 of the axle also defines a shoulder 37 adapted to engage the bearing 30 to prevent engagement of the crank arm 6 at the opposite end of the axle with the outboard surface of the related bracket 12.

Each bracket 12 is provided beneath its bearing 30 with a socket 38 affording a substantially complementary slidable fit for the outboard end 16 of the related spring 14 to anchor the spring against rotation relative to the bracket 12, the opposite end 18 of the spring being afforded a similar slidable fit within a substantially complementary opening of a lug 40 secured in any desired manner as, for example, by welding at 42 to the axle over which the spring 14 is sleeved, whereby upward rotation of the crank arm 6 stresses the spring 14 between the lug 40 of the axle and the related bracket 12.

The brackets 12 are preferably provided with openings 44 for the reception of any suitable means, such as bolt and nut assemblies, for attaching the brackets to a vehicle diagrammatically illustrated at 46 in Figure 4, whereby the wheel and axle assembly, including the brackets 12, may be readily assembled and disassembled as a unit with respect to the vehicle 46, the wheels 10 affording support for the vehicle at opposite sides thereof, as will be readily understood by consideration of Figure 1.

Preferably the caps 22 of the respective brackets 12 are provided with stop lugs 48 for engaging the underside of the crank arms 6 to limit downward rotation thereof, and the lugs 48 are preferably so formed and arranged that, upon tightening of the bolt and nut assemblies 26 and 28 to urge the caps to assembled position shown in Figure 4, the stop lugs 48 rotate the cranks upwardly slightly, to pre-stress the springs 14.

It may be noted that the wheel and axle assemblies may be quickly disassembled as, for example, to replace a broken spring by detaching the bolt and nut assemblies 26 and 28 and the cap screws 36, whereby the brackets 12, if detached from the vehicle 46, may be pulled away from each other and the entire wheel and axle assembly may be taken apart, as will be readily understood by those skilled in the art.

If desired, however, the brackets 12 may be formed integral with or permanently attached to the vehicle 46 without preventing disassembly of the wheel and axle assembly, inasmuch as the axles may be pulled out of the sockets 32 upon removal of the cap screws 36 and, if desired, may be dropped from the bearings 20 upon removal of the bolt and nut assemblies 26 and 28.

Figures 5 to 7 illustrate a modification of the device, and parts corresponding to those of Figures 1 to 4 are identified by corresponding numerals.

In the modification, the end of each axle remote from its crank arm, is journalled within a substantially semi-cylindrical bearing 50 of the related bracket 12, and is retained by a similar substantially semi-cylindrical bearing 52 of the cap 22.

As best seen in Figure 6, the washer 34 and cap screw 36 are preferably eliminated, and the end of the axle remote from its crank arm 6 is provided with a flange or head 54 recessed within the bracket 12 and cap 22 outboardly of the bearings 50 and 52.

Also in the modification of Figures 5 to 7, the outboard end 16 of the spring 14 is afforded a slidable fit within a substantially complementary opening 56 of the bracket 12 to afford a convenient anchor for the spring 14 above the bearing 50.

I claim:
1. In a wheel and axle assembly for a vehicle; the combination of spaced brackets carried by the vehicle at opposite sides thereof, forward and rearward axles, each being rotatably journalled in both brackets, a crank arm on the forward axle extending rearwardly therefrom and overlapping the rearward axle, a crank arm on the rearward axle extending rearwardly therefrom, springs sleeved over the ends of respective axles remote from their crank arms, said springs being anchored to the respective axles and to the related brackets for resisting upward pivotal movement of said arms, and means on said arms for connection to associated wheels, the end of each axle remote from its crank arm terminating in a segment smaller than the inner diameter of the related spring to accommodate removal and replacement thereof when the axle is disassembled.

2. In a wheel and axle assembly for a vehicle; the combination of spaced brackets carried by the vehicle at opposite sides thereof, forward and rearward axles, each being rotatably journalled in both brackets, a crank arm on the forward axle extending rearwardly therefrom and overlapping the adjacent extremity of the rearward axle, a crank arm on the rearward axle extending rearwardly therefrom, springs sleeved over the respective axles, each of said springs being anchored to the related axle and to the related bracket for resisting upward pivotal movement of the related crank arm, means on each axle and the bracket remote from the crank arm thereof for limiting movement of said crank arm inboardly toward the other bracket, and means on said arms for connection to associated wheels, the end of each axle remote from its crank arm terminating in a segment smaller than the inner diameter of the related spring to accommodate removal and replacement thereof when the axle is disassembled.

3. In a wheel and axle assembly for a vehicle; the combination of spaced brackets having means for attachment to said vehicle, forward and rearward axles, each being rotatably journalled in both brackets, a crank arm on the forward axle extending rearwardly thererfom and overlapping the adjacent end of the rearward axle, a crank arm on the rearward axle extending rearwardly therefrom, springs sleeved over the ends of respective axles remote from their crank arms, each of said springs being anchored to the related axle and to the related bracket, an annular shoulder on each axle facing the crank arm of the other axle and engageable with a complementary annular portion of the adjacent bracket, and means on said arms for connection to associated wheels, the end of each axle remote from its crank arm terminating in a segment smaller than the inner diameter of the related spring to accommodate removal and replacement thereof when the axle is disassembled.

4. An axle assembly comprising spaced brackets for supporting an associated vehicle, front and rear axles, each being rotatably journalled in both brackets, crank arms projecting rearwardly from respective axles at remote ends thereof, means on said arms for attachment to associated wheels, and spring means sleeved over the axles, said means being connected to said axles and brackets for resisting upward rotation of said arms, the end of each axle remote from its crank arm terminating in a segment smaller than the inner diameter of the related spring to accommodate removal and replacement thereof when the axle is disassembled.

5. In a wheel and axle assembly for a vehicle; the combination of spaced brackets, a pair of axles, each being rotatably journalled in both brackets, crank arms projecting angularly from respective axles at opposite ends thereof, said arms being disposed outboardly of respective brackets, stops on said brackets engaging the underside of respective crank arms for limiting downward rotation thereof, and independent springs sleeved over respective axles for resisting upward rotation of respective crank arms, said springs being anchored to respective axles and to the related brackets and being pre-stressed to urge the crank arms into engagement with said stops, the end of each axle remote from its crank arm terminating in a segment smaller than the inner diameter of the related spring to accommodate removal and replacement thereof when the axle is disassembled.

6. In a wheel and axle assembly; a pair of brackets, an axle having one end thereof rotatably journalled in one bracket and terminating inboardly of the outboard side thereof, said axle having another end rotatably journalled in the other bracket and extending outboardly thereof, a crank arm on said other end of said axle outboardly of said other bracket, a spring sleeved over said axle, said spring being connected to said axle and to one of said brackets for resisting upward rotation of said arm, another axle spaced rearwardly of the first mentioned axle, said other axle having one end thereof rotatably journalled in said other bracket and terminating inboardly of the outboard side of said other bracket, said other axle having another end rotatably journalled in said one bracket and extending outboardly thereof, a crank arm on said other end of said other axle outboardly of said one bracket, a spring sleeved over said other axle, said last mentioned spring being connected to said other axle and to one of the brackets for resisting upward rotation of the crank arm on said other axle, means on said arms for connecting the same to associated wheels, said arms being of approximately equal length, and the connecting means of the arm of said one axle being disposed forwardly of the connecting means of the arm of said other axle, the end of each axle remote from its crank arm terminating in a segment smaller than the inner diameter of the related spring to accommodate removal and replacement thereof when the axle is disassembled.

7. A wheel and axle assembly comprising spaced bearing brackets, an axle having one end terminating inboardly of one bracket and rotatably connected thereto, said axle having another end extending outboardly of the other bracket and rotatably connected thereto, a crank arm on said other end outboardly of said other bracket, means on said arm for connection to an associated wheel, spring means connected to said axle and to at least one of the brackets for resisting upward rotation of said crank arm, another axle having one end thereof terminating inboardly of said other bracket and rotatably connected thereto, said other axle having another end extending outboardly of said one bracket and rotatably connected thereto, a crank arm on said other end of said other axle outboardly of said one bracket, means on said last mentioned arm for connection to an associated wheel, and spring means connected to said other axle and to at least one of said brackets for resisting upward rotation of the last mentioned arm, the spring means associated with each axle being characterized by a coil sleeved thereover, said coil having approximately parallel end portions, one of the end portions being slidably fitted within an opening of the related bracket, and the other of said end portions being slidably fitted within an opening in a projection of the related axle at one side of its rotational axis, the end of each axle remote from its crank arm terminating in a segment smaller than the internal diameter of the related coil to accommodate removal and replacement of the latter upon disassembly of the axles from the brackets.

References Cited in the file of this patent

UNITED STATES PATENTS

| Number | Name | Date |
| --- | --- | --- |
| 464,967 | Hawes | Dec. 15, 1891 |
| 1,956,877 | Prouty et al. | May 1, 1934 |
| 2,226,047 | Borgward | Dec. 24, 1940 |
| 2,254,261 | Best | Sept. 2, 1941 |
| 2,426,513 | Linn | Aug. 26, 1947 |
| 2,477,822 | Probst | Aug. 2, 1949 |
| 2,558,311 | Morrow | June 26, 1951 |
| 2,609,212 | McMurtrie | Sept. 2, 1952 |